J. W. FITZ GERALD.
BATTERY COVER.
APPLICATION FILED APR. 1, 1920.

1,357,283.

Patented Nov. 2, 1920.

Inventor
John W. Fitzgerald

By Whittemore Hulbert + Whittemore
Attorneys

UNITED STATES PATENT OFFICE.

JOHN W. FITZGERALD, OF DETROIT, MICHIGAN.

BATTERY-COVER.

1,357,283.  Specification of Letters Patent.  Patented Nov. 2, 1920.

Application filed April 1, 1920. Serial No. 370,385.

*To all whom it may concern:*

Be it known that I, JOHN W. FITZGERALD, a citizen of the United States of America, residing at Detroit, in the county of Wayne and State of Michigan, have invented certain new and useful Improvements in Battery-Covers, of which the following is a specification, reference being had therein to the accompanying drawings.

The invention relates to storage batteries used upon motor vehicles, and it is the object of the invention to provide a protecting cover which incloses the terminals of the cells and which may be quickly attached or detached to permit of access to the battery for its removal and replacement.

Figure 1:
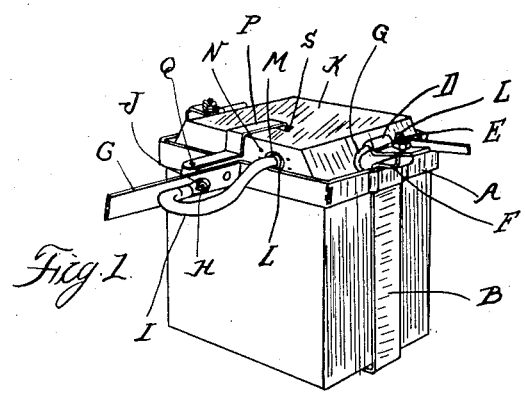
Figure 1 is a perspective view showing the battery in its mounting and the protecting cover in place.
Figure 2:
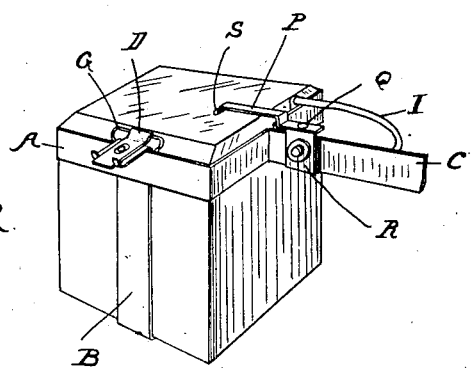
Fig. 2 is a similar view looking from the opposite side.
Figure 3:
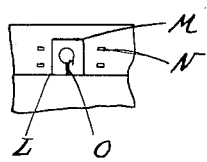
Fig. 3 is a detail view of the insulator bushing.

With a certain well known type of motor car the storage battery is carried by a metallic frame, comprising a rectangular frame A of a size to receive the battery box; a strap B depending from said frame and normally supporting the box; a bar C to one side of the frame A and extending across the vehicle to the opposite side thereof; clamps D which are secured by bolts E to outwardly extending ears F of the strap B and which engage the handle G of the battery box to hold the latter in fixed position. There is also provided a stud H on the bar C to which the grounded terminal I of the battery is secured by a clamping nut J.

My protecting cover is adapted for engagement with the equipment above described and is constructed as follows: K is an inverted pan or cover, preferably formed of metal, and fitting within the frame A engaging the top of the battery box. The sides of the pan K are cut away at L and L′ for the passage of the conductors leading from the battery, and in these cut-away portions are located insulator bushings M. These bushings are preferably formed of rubber secured to the margin of the cut-away portions L and L′ by prongs N struck up therefrom, and the lower portion of the bushing is split at O to permit of engaging the same with the conductor. P is a holding down member for the cover, which is pivotally attached at Q to an apertured member R which is engageable with the stud H for the grounded terminal I.

The construction as described is exceedingly simple and may be quickly attached to the standard equipment by merely removing the nut J and placing the member R in engagement with the stud H. The cover K may then be placed over the battery box, pressing it down so that the battery conductors will force themselves through the split insulator bushings M. The member P is then turned upon its pivot Q so as to overlie the cover, which latter has a recess S therein for engaging the free end of said member P to hold the same from displacement. The member P is also flexible, resilient and of such shape that when forced over the cover, it is placed under slight tension, thereby firmly holding the cover in position.

What I claim as my invention is:

1. The combination with a battery holder, including a top frame through which the battery box is inserted, of a cover fitting over the battery box within said frame, and means on said frame for detachably clamping said cover in position.

2. The combination with a battery holder, including a top frame for receiving the battery box, of a cover for engaging the box within said frame, cut away for the passage of a conductor, and a flexible insulator bushing in said cut-away portion for engagement with said conductor.

3. The combination with a battery holder, including a top frame through which the battery box is inserted, of a cover for engaging said box within said frame comprising an inverted pan-shaped member, the side of said member being cut away for the passage of the battery conductor, a flexible split bushing secured within said cut-away portion and engageable with said conductor, and means secured to said frame for detachably clamping said cover in position.

4. The combination with a battery holder, including a top frame through which the battery box is inserted, of a cover for said box engaging the same within said frame, and clamping means for said cover comprising a member secured to said frame, and a flexible resilient arm pivoted to said member and movable over and into engagement with said cover.

5. The combination with a battery holder, including a top frame through which the battery box is inserted, of a cover for said box within said frame, a grounded terminal for the battery, a stud secured to said frame to which said grounded terminal is attached, an apertured member engageable with said stud, and an arm pivotally attached to said member movable into and out of engagement with said cover.

In testimony whereof I affix my signature.

JOHN W. FITZGERALD.